United States Patent
Rathonyi et al.

(10) Patent No.: US 6,532,211 B1
(45) Date of Patent: Mar. 11, 2003

(54) COMMUNICATION DEVICE AND METHOD

(75) Inventors: Bela Rathonyi, Malmö (SE); Farooq Khan, Parlin, NJ (US); Reiner Ludwig, Düren (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/421,540

(22) Filed: Oct. 20, 1999

(30) Foreign Application Priority Data

Oct. 21, 1998 (EP) .............................................. 98119947

(51) Int. Cl.[7] .................................................. H04L 1/18
(52) U.S. Cl. ...................... 370/230; 370/235; 370/469; 370/474; 714/1
(58) Field of Search ................................ 370/229, 230, 370/235, 345, 347, 394, 468, 469, 474, 476, 477, 395.4, 395.41, 395.42, 466, 470, 471; 714/1, 18

(56) References Cited

U.S. PATENT DOCUMENTS 5,497,371 A    3/1996   Ellis et al.
5,671,156 A  * 9/1997   Weerackody et al. .......... 714/1

FOREIGN PATENT DOCUMENTS

| EP | 0-743-764 A2 | 11/1996 |
| EP | 0-768-806 A2 | 4/1997 |
| EP | 0-790-713 A2 | 8/1997 |
| GB | 2-320-869 A | 7/1998 |

OTHER PUBLICATIONS

Jonas De Mare, Link Adaptation in GPRS, Master Thesis Report, pp. 1–43, Mar. 1998.*
Tateesh et al, Link Adaptive Multi–rate Coding Verification System for CDMA mobile Communications, IEEE, pp. 1969–1973, 1996.*
Liu et al, Error control schemes for networks: An overview, Beltzer Science Pubishers BV, pp. 167–182, 1997.*
Cai et al, General Packet Radio Service in GSM, IEEE, pp. 122–131, Oct. 1997.*

* cited by examiner

Primary Examiner—David Vincent
Assistant Examiner—Frank Duong

(57) ABSTRACT

A communication device and method is provided, for which, when having implementations of first protocol that specifies different reliability levels for sending PDUs of a second protocol, where the second protocol specifies segmentation of PDUs of a third, higher layer protocol, a capability is introduced for setting the reliability level of second protocol (L2_ARQ) PDUs differently for second protocol PDUs belonging to a defined data structure containing such second protocol (L2_ARQ) data units. The defined data structure can be a higher layer protocol data unit or the send window. Thereby the delay caused by retransmission of second protocol data units can be reduced significantly.

28 Claims, 9 Drawing Sheets

SENT, BUT NOT ACKNOWLEDGED  NOT JET SENT

SW

COMMUNICATION DEVICE AND METHOD

FIELD OF THE INVENTION

The present invention relates to a communication device and method for data unit based communication, where implementations of at least a first and second communication protocol are used, and PDUs (Protocol Data Units) of a third, upper layer protocol are segmented into PDUs of the second, lower layer protocol, and these lower layer PDUs are sent over a physical connection in accordance with the first protocol, which provides adjustable reliability levels for the lower layer PDUs.

BACKGROUND OF THE INVENTION

As is known in the art of communication, protocols are sets of rules with which two points can exchange data units in a defined way. Two implementations of a protocol at two points that exchange data units are also referred to as peers. For the purpose of the present specification, the term data unit or protocol data unit (PDU) will refer to the finite data carrier specified by a given protocol. It may be noted that with respect to different protocols, different terms are used for the PDUs. For example, the data units of the internet protocol (IP) are referred to as packets, whereas the data units of the point-to-point protocol (PPP) are referred to as frames. All such terms, i.e. frames, packets etc. fall under the general term data unit.

Furthermore, the concept of layering different protocols is also well-known. According to this concept, data units of one protocol are embedded into data units of another protocol when being sent, and are extracted when being received. The term "embedding" refers to both the possibility of encapsulation as well as segmentation.

Figure 2:
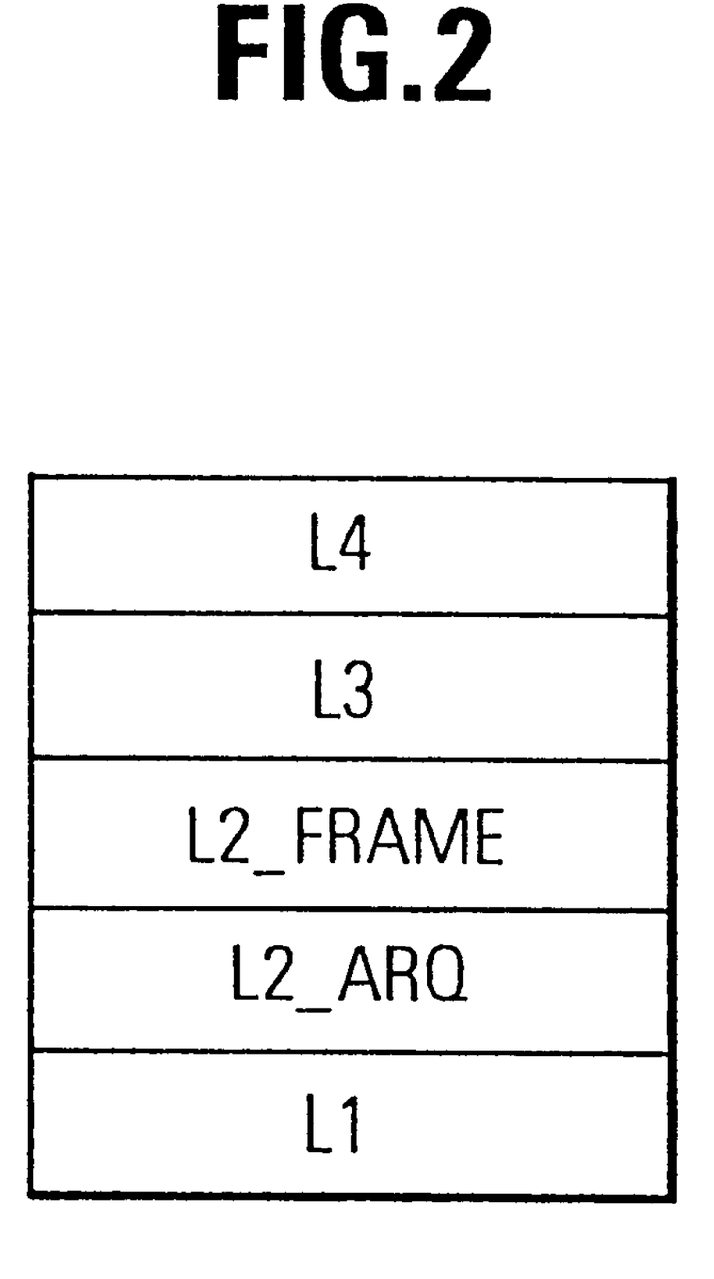
FIG. 2 shows a generic protocol stack.

FIG. 2 shows a generic stack, and the figure introduces a number of terms that will be used as examples and for explanatory purposes in the following description. The stack shown in FIG. 2 shows five layers. Naturally, the number of layers can be larger. L3 refers to a network layer protocol, e.g. the internet protocol IP. L4 refers to a protocol above the network layer, e.g. the transmission control protocol TCP. L4 is also to be seen as representing all protocols that may lie above. L2_Frame refers to a link layer protocol which embeds or frames L3 PDUS, for example the point to point protocol PPP, which is typically used for circuit-switched data in systems operating in accordance with the GSM (global system for mobile communication) standard. Other examples would be LLC (logical link control; defined in standard GSM 04.64) used for GPRS (General Packet Radio Service; defined in standard GSM 03.64) or W-CDMA (wide band code division multiple access). L2_ARQ refers to a link layer protocol that can segment L2_Frame PDUs into smaller L2_ARQ PDUs and implements an automatic repeat request function ARQ on the basis of these L2_ARQ PDUS. Automatic repeat request (ARQ) means that the protocol supports an automatic retransmission of PDUs under predetermined conditions. Examples of an L2_ARQ protocol are the radio link protocols RLP used for circuit-switched data in GSM, the radio link control protocol (RLC) used for GPRS and the RLCP (Radio Link Control Protocol) used for W-CDMA.

L1 refers to a physical layer protocol or a combination of physical layer protocols that can operate on the basis of single or plural L2_ARQ PDUs. The L1 protocol is to be understood as a protocol that can provide at least two different reliability levels for the transmission of L2_ARQ PDUs. Examples of the L1 protocol are FEC protocols (forward error control) or power control protocols, or a combination of both. For example, different L2_ARQ PDUs can be protected with varying strength of forward error control and/or with varying transmission power. Further possibilities for adjusting the transmission reliability, which may be used individually or combined, are changing the spreading factor in CDMA or W-CDMA, the interleaving depth, the modulation or the antenna diversity. As these concepts are known in the art, a further description is not necessary.

It may be noted that the L2_Frame protocol is optional, as it would also be possible that the L3 protocol PDUs are directly segmented by the L2_ARQ protocol, without first being encapsulated into L2_Frame protocol data units.

Commonly, the L1 protocol will have a general adoption mechanism for deciding on the reliability level that is to be set for each L2_ARQ PDU. Different known physical layer protocols provide different adoption mechanisms, e.g. the setting of the reliability level may depend on the quality of the physical link over which data units are being sent.

Such an arrangement can lead to a number of problems. Many L3 protocols and protocols running on top of L3 are sensitive to a delay per data unit and can perform badly or even fail if the delay per data unit exceeds certain bounds. The problem is that when the L3 protocol is running over L2_Frame/L2_ARQ or on L2_ARQ directly, the L2_ARQ protocol can introduce an additional delay per L3 PDU, due to the retransmission of L2_ARQ PDUs. This additional delay is basically unbounded and can cause considerable problems. This will be explained in connection with the diagram shown in FIG. 3.

For the following explanation, it will be assumed that L2_Frame PDUs are being segmented by the L2_ARQ protocol, but as already mentioned above, it is equally well possible that L3 protocol PDUs are directly being segmented.

Figure 3:
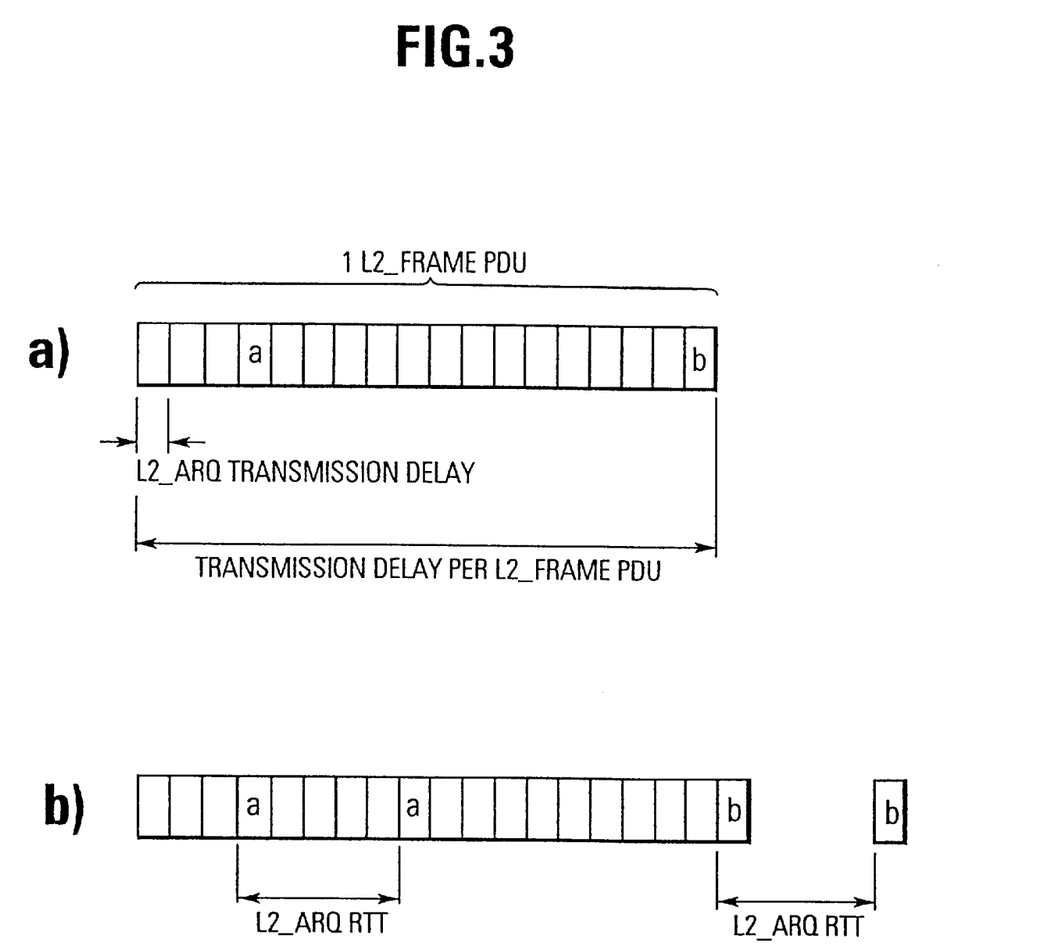
FIG. 3 explain certain problems that can occur in connection with the protocol arrangement shown in FIG. 2.

FIG. 3a shows one L2_Frame PDU, and this higher layer PDU is segmented into a given number of L2_ARQ data units. Two of these L2_ARQ data units are marked as a and b, respectively, for the purpose of a later explanation. As also indicated in FIG. 3a, the L2_Frame PDU has a given transmission delay, i.e. a given length, just as the L2-ARQ data unit has a given length or transmission delay.

As show n in FIG. 3b, the following problem can occur. If the L2_ARQ data unit a has to b e re transmitted, then the number of L2_ARQ data units that needs to be sent is increased by one, and correspondingly the transmission of the L2_Frame PDU is delayed by the transmission delay of one L2-ARQ data unit. However, if the L2_ARQ data unit marked as b, which lies at the end of the L2_Frame PDU, has to be retransmitted, then this will delay the transmission of the L2_Frame PDU by the round trip time (RTT) of the L2_ARQ layer. The round trip time RTT of a layer is basically the time that passes between the sending of a data unit of that layer by a sending peer, and the receipt by the sending peer of the acknowledgment message that confirms that the given data unit was received at the other end by the receiving peer. The L2_ARQ RTT is typically much longer than the L2_ARQ Transmission delay.

As already mentioned, this delay can cause significant problems in higher layers.

Another problem can occur in systems where the L2_ARQ peer uses window-based flow control. Window-based flow control is well-known in the art and basically means that the flow control is accomplished in accordance with a defined number of consecutive octets or bits that is referred to as a send window, where the allowed number of unacknowledged data units is limited to said send window. In other words, flow control is such that in a given series of data units to be sent, a certain number of data units following a given data unit may be sent out, even though the safe receipt of said given data unit has not yet been acknowledged, but this number of unacknowledged data units is limited to the send window. As already mentioned, this concept is well-known in the art, see e.g. TCP/IP Illustrated, Vol. 1, The Protocols, by W. Richard Stevens, Addison-Wesley Longman, Inc. 1994. A further explanation is therefore not necessary.

Figure 9:
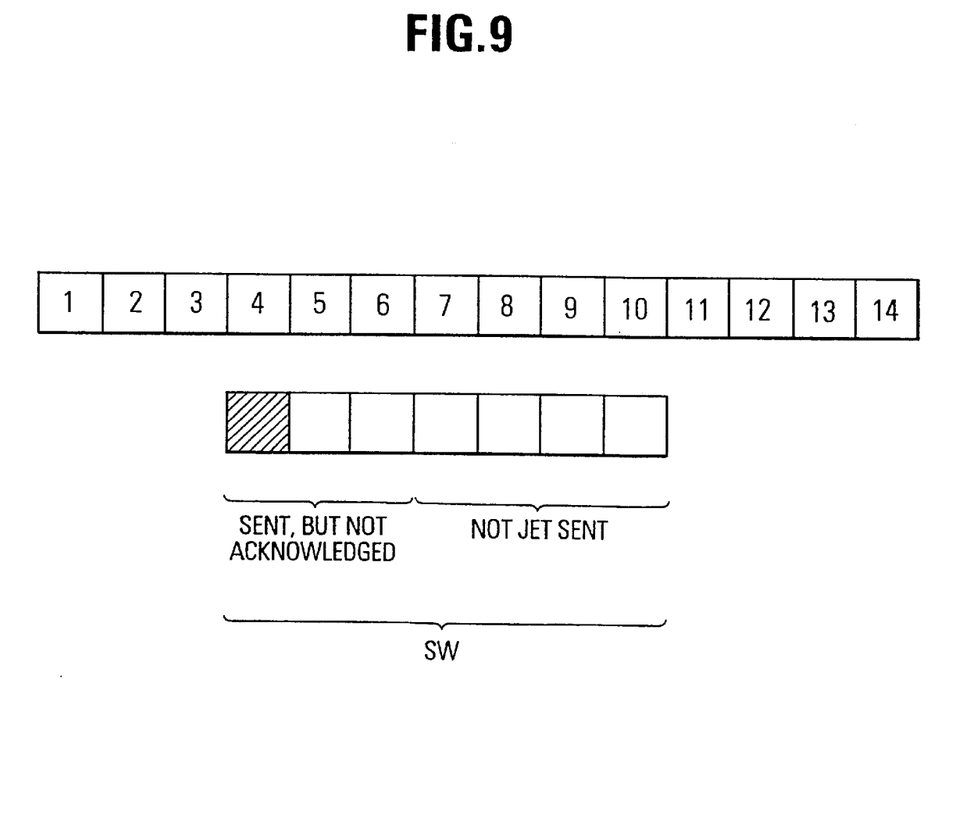
FIG. 9 explains the problem of a stalled send window in window-based flow control.

In an L2_ARQ peer that uses window-based flow control, the sender cannot send any new L2_ARQ PDUs when the send buffer is exhausted with back-logged copies of L2_ARQ PDUs that have already been sent but not acknowledged by the receiving L2_ARQ peer. This will briefly be explained in connection with FIG. 9. This figure shows a consecutive series of PDUs to be sent, fourteen in this example. According to window-based flow control, the left end (PDU 4) of the send window SW, which is shown as comprising the PDUs 4 to 10, moves in accordance with the PDUs that were sent and acknowledged. In the example of FIG. 9, PDUs 1 to 3 have been sent and acknowledged, so that PDU 4 constitutes the left end of the send window. For the purpose of the present explination it will be assumed that the length of the send window is constant.

The send window itself may be generally seen as having two parts, namely older PDUs that have been sent but not acknowledged (4 to 6) and the remaining PDUs in the send window SW, which in accordance with flow control are allowed to be sent because they are in the send window, but which have not yet been sent (7 to 10).

A stall of the send window may occur in the following situation. As long as the oldest PDU (4 in the example) of the send window has not been sent correctly, it can not be acknowledged. As a consequence, if no acknowledgment for the oldest PDU is received, the left end of the send window SW will not move to the right. As long as there are PDUs in the send window that have not yet been sent, this basically does not cause problems, as a sending of PDUs continues. But if all of the PDUs in the send window have been sent, then the further transmission of PDUs is completely blocked as long as the oldest PDU is not acknowleged, i.e. the send window is stalled because it can not move to the right. As a consequence, the above described delay caused by L2_ARQ retransmissions in the order of the round trip time may stall the send window and lead to a decreased throughput.

OBJECT OF THE PRESENT INVENTION

It is the object of the present invention to solve these problems and provide a communication device and method of the aforementioned kind that can reduce the delay caused by the L2_ARQ layer retransmission s.

SUMMARY OF THE PRESENT INVENTION

This object is solved by the devices and methods described in independent claims.

According to the present invention, when having implementations of first protocol that specifies different reliability levels for sending PDUs of a second protocol, where the second protocol specifies segmentation of PDUs of a third, higher layer protocol, a capability is introduced for setting the reliability level of second protocol (L2_ARQ) PDUs differently for second protocol PDUs belonging to a defined data structure containing such second protocol (L2_ARQ) data units.

In the following, the terminology used in the introduction will be retained, and the above description is herewith incorporated into the description of the invention. In this way, the present invention can be used in the context of any mechanism for setting the reliability level, e.g. those already mentioned, i.e. transmission power, forward error correction, spreading factor, interleaving depth, modulation or antenna diversity etc., be it alone or in any desired combination.

According to a preferred embodiment, the defined data structure containing second protocol PDUs is one third protocol PDU that was segmented into second protocol PDUs, i.e. one L2_Frame or L3 PDU in the above terminology. In this case, the present invention provides the capability of setting the L1 reliability level differently for L2_ARQ PDUs with respect to their position in one L2_Frame (or L3) PDU. In other words, the data units of the L2_ARQ protocol that belong to one L2_Frame PDU can have their reliability level set in dependence on specific properties relating to the fact that the L2_ARQ PDUs are in one L2_Frame PDU and relating to the relationship between these L2_ARQ PDUs with respect to one another.

In this embodiment, the data units of the second protocol that belong to one data unit of a third protocol (referred to as L2_Frame or L3 above) are identified, and the data units of the second protocol that belong together in such a way are then classified into at least two different categories, and finally the capability is provided of setting the reliability level for these data units of the second protocol differently for different categories.

According to a preferred version of this embodiment, it is possible to solve the above problem described in connection with FIG. 3, namely if two categories are defined, where the first relates to the L2_ARQ data units belonging to the front part of a L2_Frame or L3 data unit, and a second category is defined that relates to the L2-ARQ data units that come towards the end, and it is possible to increase the reliability level (e.g. increased sending power or improved forward error correction) of the data units that come towards the end, the detrimental effect resulting from the situation described in connection with FIG. 3 can be avoided, because the increased level of reliability for such L2_ARQ data unit such as b (see FIG. 3b), avoid the retransmission of such L2_ARQ data units, so that the delay caused by the retransmission of L2_ARQ PDUs is preferably restricted to the actual L2_ARQ transmission delay, and not determined by the round trip time.

According to another preferred embodiment, the defined data structure is not one PDU of the protocol that lies immediately above the L2_ARQ protocol, but is one PDU of protocol that lies higher, e.g. referred to as L4 in FIG. 2. Preferably, as in the previous embodiment, the reliability level of L2_ARQ PDUs that are associated with the end of the L4 PDU is set higher than the level of the preceding L2_ARQ PDUS. This embodiment is especially advantageous in the event that the L4 PDU is fragmented into more than one L3 PDU. An example of this is the so-called IP fragmentation of TCP packets. Then it is e.g. possible to set the reliability level of those L2_ARQ PDUs that belong to the fragments towards the end of the L4 PDU higher than for the PDUs belonging to the first fragments.

According to another preferred embodiment, the defined data structure containing L2_ARQ data units is the send window used for window-based flow control. Then, the problem of stalled windows in window-based flow control may be solved, namely by differentiating between L2_ARQ PDUs that are at the beginning of the send window (older PDUs) and those that are towards the end (younger PDUs), where the retransmission of older PDUs (e.g. PDU 4 in FIG. 9) is done with a higher reliability level than for the first transmission of the same PDU and/or than for younger PDUs. Preferably the degree of increase of the reliability level is a function of the age (i.e. the older the higher) and/or a function of how often the PDU has been transmitted (i.e. each repeated retransmission receives a higher reliability level than the previous retransmission or the first transmission).

Also, with the help of another preferred embodiment, it is possible to discriminate between different parts of an L3, L2_Frame, or L4 PDU at the L1 protocol layer, and to treat those discriminated parts differently. It becomes possible to set the reliability level of certain parts that are more sensitive to delay higher than the reliability level of other parts. For example, the IP header of an IP packet (L3 PDU) could be protected more (transmitted at a higher L1 reliability level) than the payload. This decreases the average delay for transmitting the IP header (less L2_ARQ retransmissions) and allows the IP router to make the routing decision as soon as possible.

The inventive concept, which may be referred to as providing the capability of unequal error protection for different parts of a defined data structure, presents the following advantages:

- low end-to-end third protocol (L2_FRAME/L3) PDU transfer delay,
- low end-to-end third protocol (L2_FRAME/L3) PDU delay jitter,
- efficient bandwidth utilization,
- less buffer space for storing the L2_ARQ PDUs thus reducing the overall system cost, and
- if the scheme is implemented at every possible protocol layer, the savings due to less buffer space requirements may be very high and the overall quality of service perceived by users improves.

A very important advantage of the present invention is that it does not require any modifications of the relevant protocols themselves, i.e. it does not affect any standard. It only requires changes to the protocol implementations.

BRIEF DESCRIPTION OF DRAWINGS

Other features and advantages of the present invention will become more apparent from the following detailed description of preferred embodiments, which make reference to the figures, in which.

DETAILED DESCRIPTION

Figure 1:
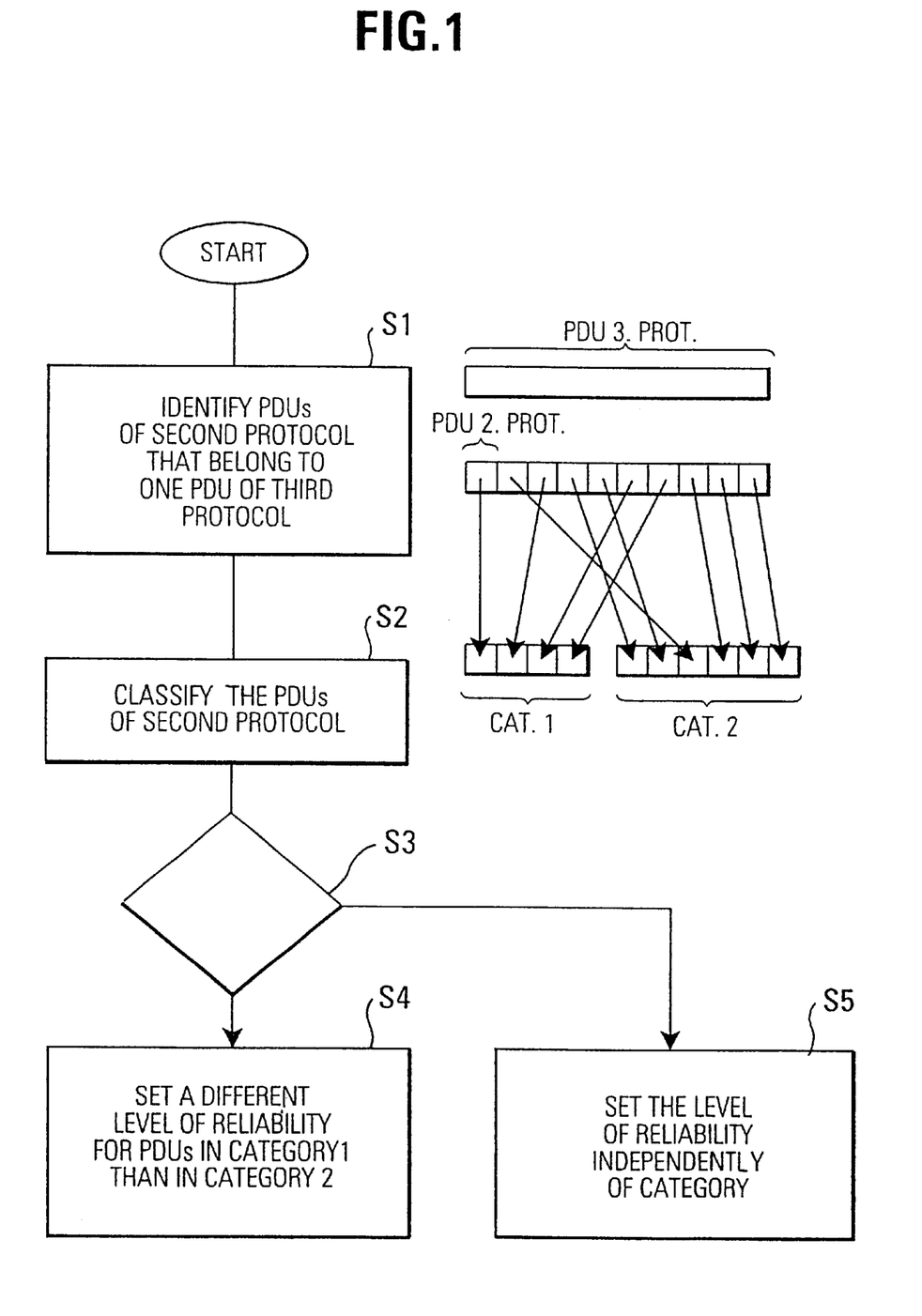
FIG. 1 shows an explanatory diagram of the present invention.

FIG. 1 shows an embodiment of the present invention, in which the defined data structure containing L2_ARQ PDUs is a data unit of the L3 protocol. This figure will now be explained.

The left side of the figure shows a flow diagram, whereas the upper right part of the figure contains representations that serve to better understand steps S1 and S2.

In accordance with the present embodiment, it is assumed that a communication device implements a first and second communication protocol, e.g. the previously mentioned protocols L1 and L2_ARQ, respectively. The first protocol provides rules for controlling the transmission of data units of the second protocol across a given physical connection, and this first protocol provides at least two different reliability levels for the transmission of data units of the second protocol. Moreover, the second protocol provides rules for the segmentation of data units of a third protocol (e.g. the above mentioned L2_Frame or L3) into data units of the second protocol, and additionally the second protocol provides for the retransmission of data units of the second protocol under predetermined conditions. In other words, the second protocol has the above mentioned automatic repeat request feature ARQ.

On the right hand side of FIG. 1, the segmentation of a given PDU of a third protocol into PDUs of the second protocol is shown. In step S1, the PDUs of the second protocol that belong to one PDU of the third protocol are identified. This can be done in any suitable manner, e.g. by having the implementation of the second protocol determine the start and end of a third protocol PDU (e.g. the start flag and end flag) when performing the segmentation, and then communicating this information to the implementation of the first protocol, or the implementation of the first protocol is done in such a way that it may identify said starting and end point of the data unit of the third protocol by parsing the data units of the third protocol directly.

It may be noted that this is an important distinction to known systems, in which lower layer implementations handle upper layer data transparently, i.e. are oblivious to how the data is structured in the upper layer context.

Then, in step S2, the PDUs of the second protocol are classified into predetermined categories. This is again exemplified on the right hand side of FIG. 1, by the depicted arrows. It should be noted that the depiction is to be understood in an abstract way, and not as meaning that the order in which the data units of the second protocol are arranged, in terms of transmission, is changed. More specifically, the order in which the PDUs of the second protocol are arranged is not changed by the classifying into categories.

Then, in step S3 there is a branching that depends on one or more predetermined conditions. No specific condition is given, as the present invention consists not in a specific condition, but much rather in the general concept of providing the capability that the reliability level for the PDUs of the second protocol is set in accordance with the categories into which the PDUs were classified in step S2. This can be seen in step S4 and S5. More specifically, in step S4 the reliability level for PDUs in one category is set differently than the reliability level in another category. In contrast thereto, in step S5, the reliability level is set independently of category, e.g. as it is done in known physical layer implementations, which were referred to as L1 above.

Therefore, the steps S3, S4 and S5 express the capability that the present invention provides, namely the capability of setting the reliability level for PDUs of the second protocol that belong to one PDU of the third protocol differently depending on rules of classification that specify certain categories.

Figure 4:
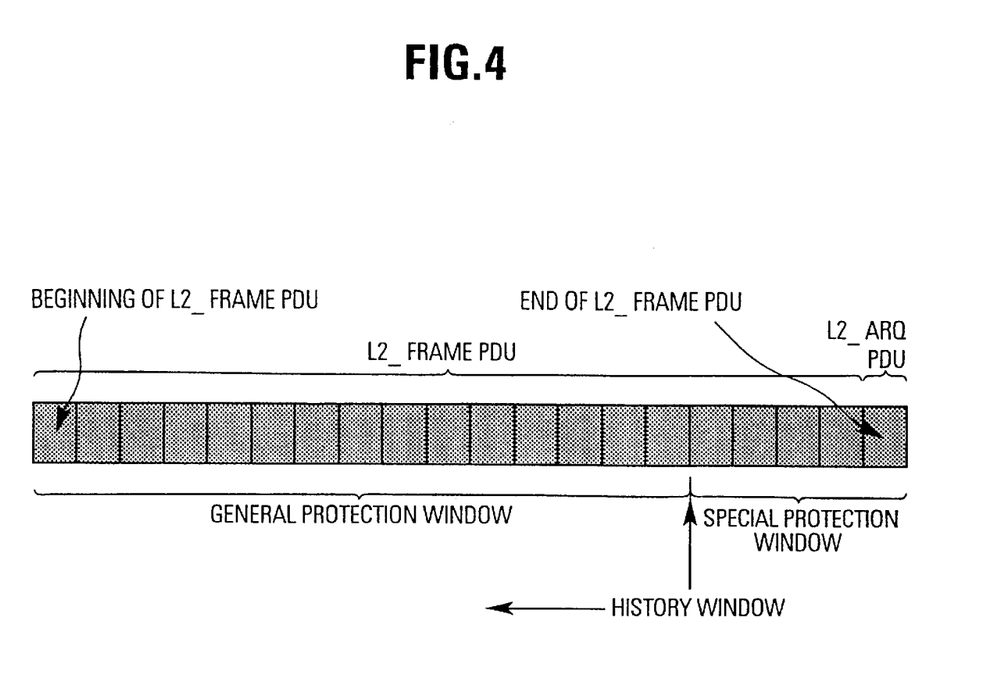
FIG. 4 shows an embodiment of the present invention.

FIG. 4 explains a preferred version of the above embodiment that solves the above described problem of an unbounded delay per third protocol PDU (e.g. L2_FRAME or L3 PDU). The same expressions as already used in connection with FIGS. 2 and 3 will be used again for easier understanding.

FIG. 4 shows one L2_FRAME PDU that has been segmented into a given number of L2_ARQ PDUs. Naturally, an L3 PDU could equally well be considered. In this embodiment, two categories for classification are provided. The first category is referred to as the General Protection Window GPW, and the second category is referred to as the Special Protection Window SPW.

The Special Protection Window SPW is defined as a consecutive sequence—in terms of the order of transmission—of L2_ARQ PDUs of one L2_FRAME PDU including the last (potentially retransmitted) L2_ARQ PDU that will be transmitted for that L2 FRAME PDU. It should be noted that the SPW can also be zero.

The General Protection Window GPW is defined as a consecutive sequence—in terms of the order of transmission—of L2_ARQ PDUs of one L2 FRAME PDU including the first L2_ARQ PDU that will be transmitted for that L2_FRAME PDU. The GPW may also be zero.

The size of the SPW is initialized to a certain value, e.g. to comprise as many L2_ARQ PDUs as can be transmitted during the L2_ARQ RTT (in other words the quotient of the RTT and the L2_ARQ transmission delay). The size of the GPW is initialized to complement the initial SPW, i.e. the sum of the SPW and GPW corresponds to the complete L2_FRAME PDU. The size of the GPW may be fixed to the initial value. In that case every retransmission of an L2_ARQ PDU from the GPW increases the SPW by one. Alternatively, the size of the GPW may increase for every retransmission of an L2_ARQ PDU of GPW up to a certain maximum value. After that maximum value has been reached, the size of the GPW remains constant and instead every retransmission of an L2_ARQ PDU of GPW increases SPW by one.

A History Window HW is also defined, which is a consecutive sequence of L2_ARQ PDUs including the last transmitted L2_ARQ PDU at a given point in time during the transmission of L2_ARQ data units that belong to the one L2_FRAME data unit.

The L1 protocol reliability level of each L2_ARQ PDU in the GPW is decided by the general protection adaptation mechanism for that protocol. The term general protection adaptation mechanism refers to the mechanism for setting the reliability level that is already provided in said protocol. This mechanism decides on the reliability level for each L2_ARQ PDU independent of which position within the respective L2_FRAME PDU (or L3 PDU) that L2_ARQ PDU holds. As already mentioned, this mechanism can be given in a variety of ways, depending on the specific L1 protocol, and can e.g. be a mechanism that sets the reliability level in dependence on the quality of the connection over which the data units are being sent.

In accordance with the invention a special protection adaptation mechanism is defined for the SPW, and the reliability level of each L2_ARQ PDU in the SPW is decided by this special protection adaptation mechanism. The special protection adaptation mechanism serves to minimize the probability that an L2_ARQ PDU in the SPW has to be retransmitted, while balancing this against minimizing the required transmission resources (e.g. transmission power). If it is deemed necessary in accordance with a given criterion (see step S3 in FIG. 1), then this can be achieved by raising the L1 reliability (e.g. raising the transmission power and/or improving the forward error control) level for the L2_ARQ PDUs in the SPW. Preferably the criterion for raising the L1 reliability in the SPW depends on the number of L2_ARQ PDUs in the GPW that need to be retransmitted. For example, if the number of L2_ARQ PDUs from the GPW that needs to be retransmitted lies below a predetermined threshold, then the reliability level in the SPW is adjusted by the same mechanism as in the GPW (see step S5 in FIG. 1), and otherwise the reliability level in the SPW is raised with respect to that of the GPW (see step S4 in FIG. 1). In other words, the special protection adaptation mechanism in this case simply consists in raising the reliability level by a predetermined factor with respect to the general protection adaptation mechanism. An alternative mechanism could consist in measuring the number of retransmissions that take place until the history window HW reaches a predetermined value, and then to decide on the changing of the reliability in the special protection window on the basis of this measured number. Another alternative may consist in simply setting the reliability level of a given percentage of the L2_ARQ PDUs at the end of each L2_FRAME or L3 PDU higher, regardless of the number of retransmissions or any other condition. Naturally, more complicated mechanisms containing further dependencies on specifically defined conditions are possible, but this lies outside of the scope of the present invention.

Consequently, it may be noted that the present invention is not restricted to any specific special protection adaptation mechanism, as such a mechanism may be selected in accordance with the requirements and preferences associated with a specific situation and protocol or protocols. Much rather, the above embodiment clearly expresses the basic concept of the invention, according to which the capability is provided for setting the reliability level in accordance with categories that are determined by classifying rules. In the above embodiment, these classifying rules relate to the location of a given L2_ARQ PDU with respect to the beginning and end of an L2 FRAME (or L3 or L4) PDU.

In this way, the embodiment provides a means for potentially applying special protection to L2_ARQ PDUs that lie at the end of the sequence belonging to one L2_FRAME PDU, thereby eliminating the problem described in connection with FIG. 3.

In the previous embodiments, the defined data structure was one PDU of the protocol that lies immediately above the L2_ARQ protocol, but the defined structure may equally well be one PDU of a protocol that lies higher, e.g. a protocol referred to as L4 in FIG. 2. Accordingly the definition of the special protection window SPW and general protection window GPW is based upon the L4 PDU instead of the L2_FRAME or L3 PDU. Preferably, as in the previous embodiments, the reliability level of L2_ARQ PDUs that are associated with the end of the L4 PDU is set higher than the level of the preceding L2_ARQ PDUs. This is especially advantageous in the event that the L4 PDU is fragmented into more than one L3 PDU. An example of this is the so-called IP fragmentation of L4 PDUs. Then it is e.g. possible to set higher the reliability level of those L2_ARQ PDUs that belong to the fragments towards the end of the L4 PDU.

In the following, another embodiment of the present invention will be described, in which window-based flow control is employed, and the defined data structure containing L2_ARQ PDUs is the send window. This embodiment specifically addresses the above mentioned problem of a stalled window when using window-based flow control. The following description is similar to that of the above embodiment, except that the data structure inside of which the PDUs are differentiated is the send window and not a higher layer PDU.

In this embodiment, the classification is done with respect to position in the send window. The solution to the stalled send window problem consists in enabling special protection for the retransmission of older L2_ARQ data units in the send window of the sending L2_ARQ peer, namely the capability is provided that the L1 reliability level is set higher for PDUs that need to be retransmitted and that lie at the beginning of the send window SW.

In other words, the problem of stalled windows in window-based flow control may be solved by differentiating between L2_ARQ PDUs that are at the beginning of the send window (older PDUS) and those that are towards the end (younger PDUs), where the retransmission of older PDUs (e.g. PDU 4 in FIG. 9) is done with a higher reliability level than for the first transmission of the same PDU and/or than for younger PDUs. In other words, for a given PDU (e.g. PDU 4 in FIG. 9), the reliability level of the first retransmission is set higher than the reliability level for the first transmission, the reliability level for the second retransmission is set higher than for the first retransmission, etc. However, it is equally well possible that the reliability level is only raised for the first retransmission with respect to the first transmission, and then remains constant for all following retransmissions. Preferably the degree of increase of the reliability level is a function of the age, i.e. the older the PDU, the higher the reliabilty level increaase. In other words, in the context of the example shown in FIG. 9, the increase in reliability level for PDU 4 would be higher than for PDU 5.

An alternative to this can consist in making the degree of increase (be it only between the first transmission and the first retransmission, or between consecutive retransmissions) dependent on the number of PDUs in the send window that have not yet been sent (right side in FIG. 9). It is clear that this mechanism for adjusting the degree of increasing the reliability level can be combined with the above mechanisms in any desirable way.

In the above embodiment, the rules for classifying the L2_ARQ PDUs not only relate to the position in the predetermined data structure (i.e. the send window), but also to the amount of retransmissions of the PDU.

As was the case with the embodiment in which the defined data structure was a higher layer data unit, there is no restriction to a specific protection mechanism.

It may be noted that in the case of the above embodiment, in which the defined data structure containing L2_ARQ PDUs is the send window, the higher layer data units may again be handled transparently, i.e. as a continuous bit stream. However, it is equally well possible to combine the above embodiments in one system, i.e. to provide a system in which the reliability level may be set both with respect to position in higher layer data units as well as with respect to position in the send window. This leads to a more complicated system, but enhances performance.

Now another embodiment of the present invention will be described, in which again the defined data structure is an L3 or L2_FRAME PDU. However, now the classification rules are not associated with the beginning and end of the L2_FRAME or L3 PDU, much rather they are related to different ranges of consecutive octets or bits of the data unit of the L2_FRAME or L3 protocol, where the ranges each correspond to a consecutive number, in terms of order of transmission, of L2_ARQ PDUs.

Preferably, two categories are specified, where a first category is associated with the header of the L2_FRAME or L3 PDU, and the second category is associated with the payload thereof.

This embodiment may also be combined with one or all of the previous embodiments.

Now, in order to provide a better understanding of the concepts and embodiments discussed above, a detailed example will be described in terms of specific protocols and GPRS. However, this example should not be seen as restrictive, as the present invention is applicable to any communication standard and protocol set that provide the features described in the claims.

For this specific example, SNDCP (Subnetwork Dependent Control Protocol) or network correspond to L3, LLC (Logical Link Control) corresponds to L2_FRAME, RLC/MAC (Radio Link Control/Medium Access Control; specified in standard GSM04.60) corresponds to L2_ARQ, and PLL/RFL (Physical Link Layer/Radio Frequency Layer) corresponds to L1.

Figure 5:
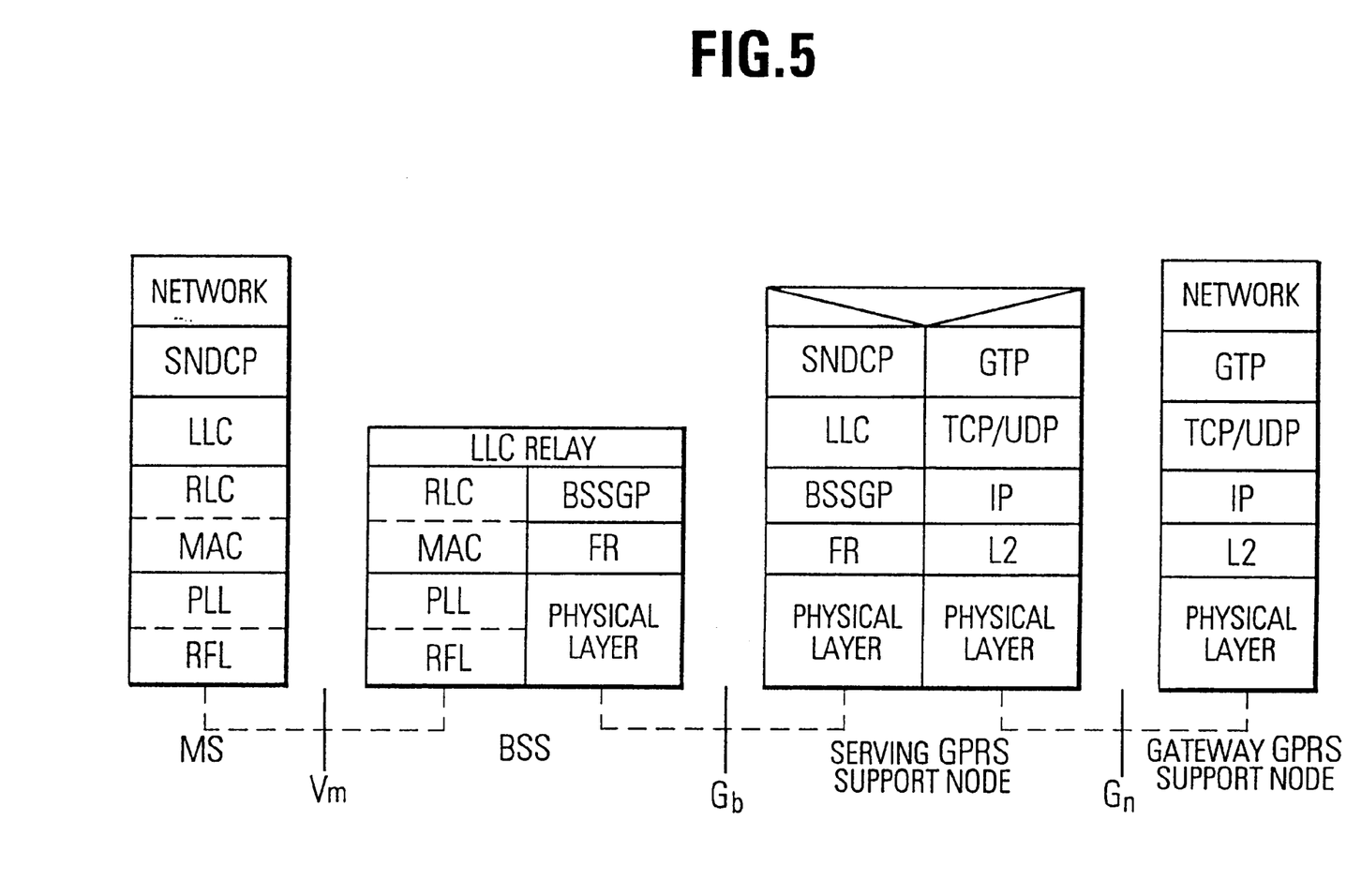
FIG. 5 shows a transmission plane of specific protocols.

FIG. 5 gives a background overview of GPRS. It shows the GPRS transmission plane up to the network layer. Radio communication between the GPRS network and the mobile station MS covers physical and data link functionality. Between the BSS (Base Station Subsystem) and the MS, the data link layer has been separated into two distinct sublayers: the LLC layer and the RLC/MAC sub layers. The variable length PDUs transferred between two LLC entities are called LLC frames. The data transfer between RLC entities occur in variable size RLC blocks.

Figure 6:
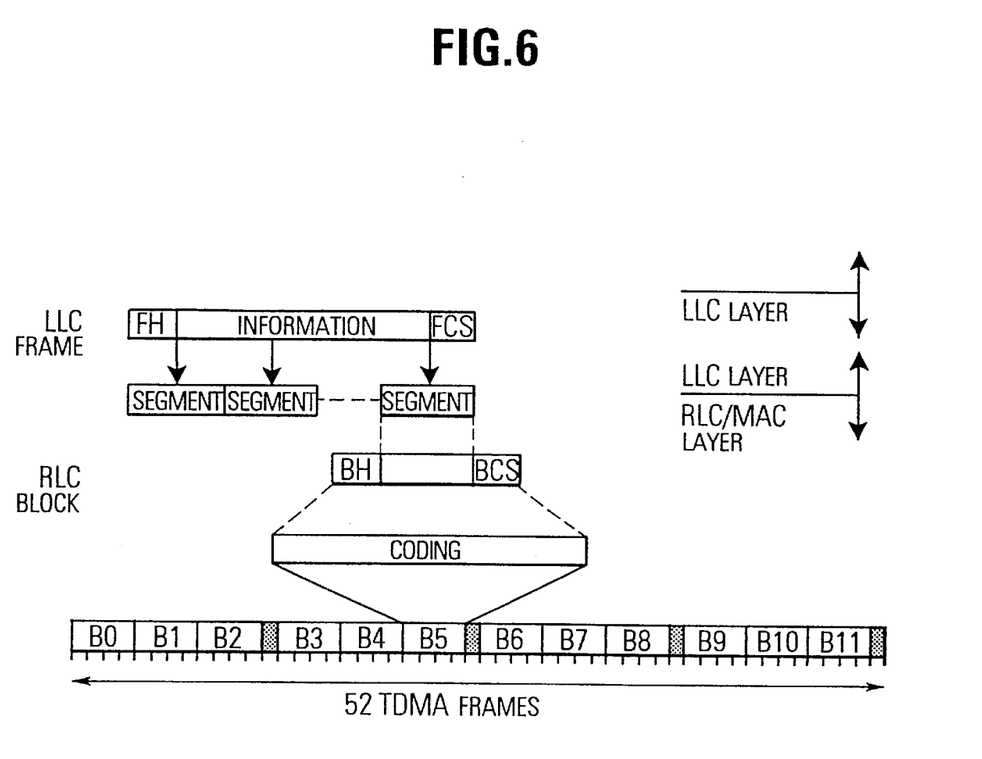
FIG. 6 shows the segmentation and transmission of an LLC frame.

For efficient transmission on the radio interface, an LLC PDU is segmented into smaller size RLC blocks as depicted in FIG. 6. This allows retransmissions to be performed at the RLC block level. The retransmissions of the erroneous RLC blocks are controlled through a selective ARQ mechanism. RLC blocks are transmitted within a window size of k blocks and the receiving side periodically sends temporary ACK/NACK (acknowledged/not acknowledged) messages. Every ACK/NACK message acknowledges all correctly received RLC blocks up to an indicated block number thus moving the beginning of the send window. Additionally, a bitmap is used to selectively request erroneously received RLC blocks. The acknowledgment of outstanding data results in further sliding of the send window. When all the RLC blocks corresponding to an LLC PDU are successfully received, the LLC PDU is delivered to the higher layer.

An RLC connection is established between two peer entities for the transmission of RLC blocks. Each RLC end-point has a receiver that receives RLC blocks and a transmitter that transmits RLC blocks. Each end-point's transmitter has a send window, while each end-point's receiver has a receive window. The block transmission between two peer RLC entities is controlled through these two windows.

If V(S) denotes the sequence number of the next-in-sequence RLC block to be transmitted, V(A) denotes the block sequence number of the oldest data block that has not been positively acknowledged by its peer, and n and k denote the block number sequence length and the window size, respectively, then the send window may be stalled (no fresh block transmission) when V(S)=[V(A)+k] modulo n.

Two approaches are commonly used in order to transmit the RLC blocks on the radio interface:

RLC blocks belonging to an LLC PDU are transmitted with the same degree of protection (coding rate etc.), and different blocks in a flow block can use different modulation and coding rates in order to adapt to the radio channel conditions (Link Adaptation LA).

The Link Adaptation LA was referred to generally as the L1 general protection adaptation above.

Now the underlying problem will be described in terms of GPRS. The end-to-end delay for a packet (e.g. LLC frame) is an important parameter. The LLC frames having some blocks retransmitted may be additionally delayed waiting for the retransmissions. It is noted that if the blocks transmitted in the beginning and the middle of an LLC frame are received with errors, NACK can be received during the remaining block transmission of this LLC frame and the erroneous block(s) can be retransmitted just after or before the last block transmission. On the other hand, if the last blocks of an LLC frame have to be retransmitted, these may cause supplementary delay due to waiting for ACK/NACK even after the transmission of the very last block. This further delays the delivery of the packet to the LLC layer. The problem then is how this kind of supplementary delay can be minimized.

The send window is stalled when V(S)=[V(A)+k] modulo n, where V(A) refers to the oldest RLC data block that has not been positively acknowledged. It is noted that if all the blocks within a block flow are transmitted with the same degree of protection (or adapted only to the radio channel conditions), the chances are higher that the send window will then be stalled. When the send window is stalled, no fresh RLC block can be transmitted. The problem is then how to avoid the send window from being stalled.

In accordance with the present invention, it is possible to protect the different RLC blocks belonging to an LLC frame or within a RLC block flow differently. The concept will be explained with the help of two examples embodying the present invention. In the first case blocks containing data from the end of an LLC frame will be transmitted with more protection, and in the second case blocks causing the send window to be stalled are transmitted with more protection compared to the other blocks. It should be noted that "more protection" means more compared to the protection determined by the LA algorithm.

In the first case, i.e. more protection for blocks at the end of an LLC frame, the present invention suggests to transmit some of the blocks at the end of an LLC PDU with more protection (coding) than the rest of the blocks, thus reducing the probability of error for these blocks. This helps reduce the delay to deliver a packet to the LLC layer. The present invention can be generalized to other layers as well, e.g. the whole last LLC frame (when there are several LLC frames per network-PDU) in a series can be transmitted with more protection.

Figure 7:
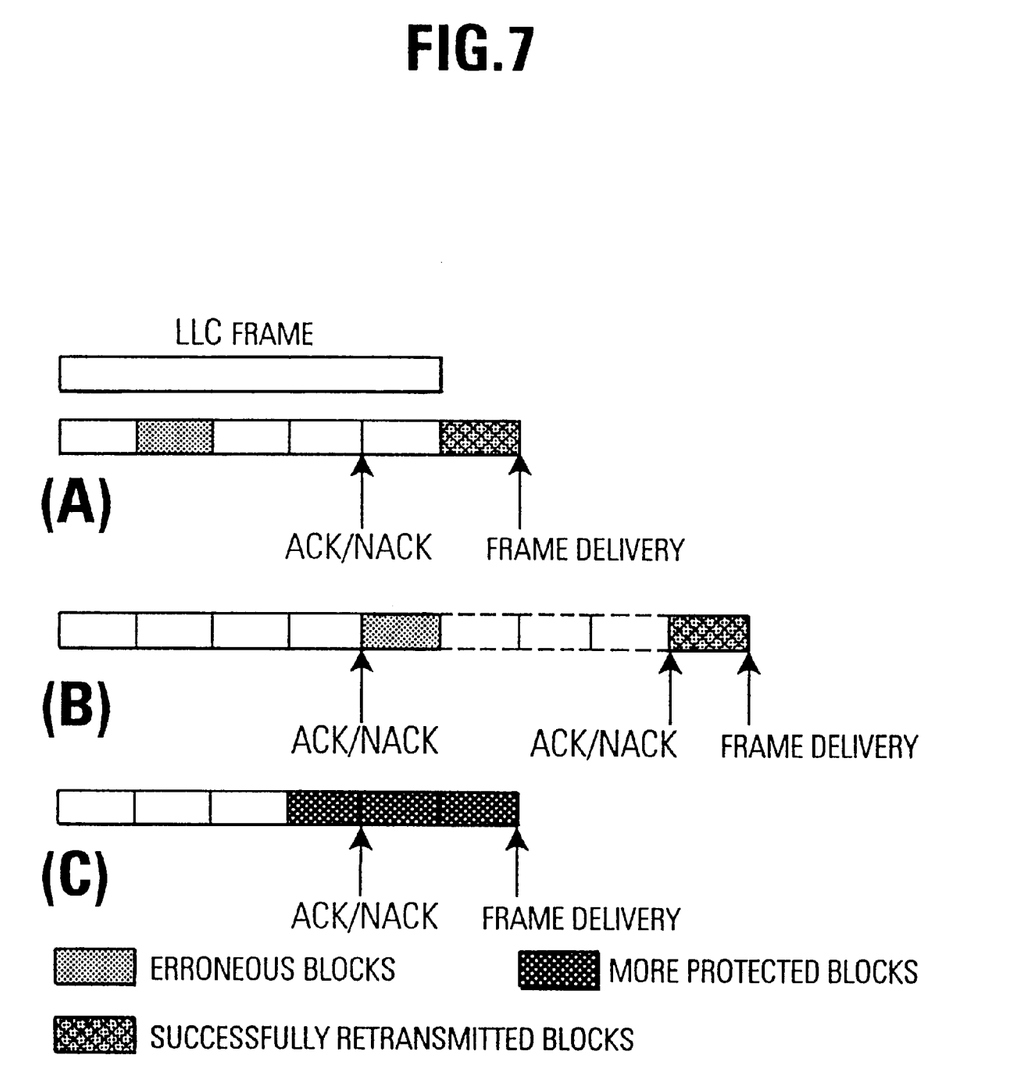
FIG. 7 explains the impact of block errors on the LLC Frame transfer delay.

This will be explained by referring to the example illustrated in FIG. 7. The ACK/NACK period is considered to be equal to four block periods. In case (A), an erroneous block at the beginning of the LLC frame was retransmitted immediately after the last block. In case (B), LLC frame delivery was delayed three block periods compared to case (A), because the last block went erroneous. In case (C), the last two blocks were transmitted with more coding and no block went erroneous. It may be noted that one more block was transmitted due to coding overheads. It is apparent that even after counting coding overheads, the LLC frame was delivered much earlier in case (C) than in case (B).

Figure 8:
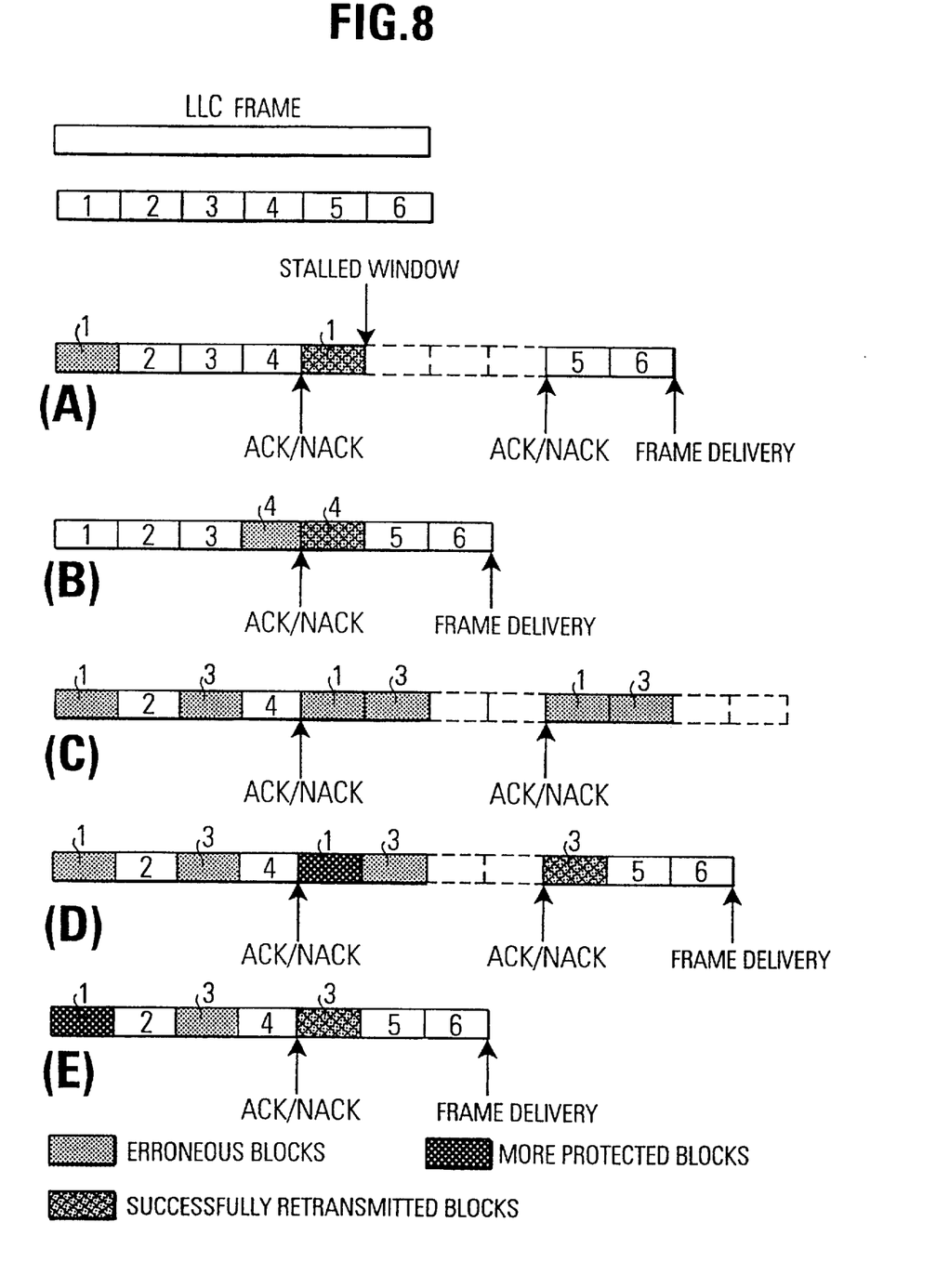
FIG. 8 shows the impact of the RLC send window and block errors on the LLC Frame transfer.

In the second case, i.e. more protection for blocks causing send window stalling, it may be deduced from the window stall condition V(S)=[V(A)+k] modulo n that the blocks at the beginning of a block flow (if received with errors) are more likely to stall the window than the blocks at the end of the flow. This phenomenon is illustrated in FIG. 8, part (A), with K=4 and n=8. The ACK/NACK period is also considered to be equal to four block periods.

In part (B), the block 4 is received with errors and retransmitted immediately after the first ACK/NACK message. The whole frame is delivered in seven block periods. Since the error occurred towards the end of the frame (or block flow), there was no effect observed on the send window.

In case (C), block number 1 and 3 are received with errors. Since the block number 1 in the beginning of the flow went erroneous, the send window is stalled. The stall condition may persist if the block number 1 is again received with errors, thus increasing the frame transfer delay as depicted in FIG. 8, part (C).

In part (D) of FIG. 8, block number 1 causing the stall condition is retransmitted with more protection, thus helping the send window to advance.

Since the blocks in the beginning of a flow are more likely to stall the window, they can be transmitted with more protection right from their first transmission, as illustrated in part (E).

Although the present invention was described above in terms of specific examples, this serves the purpose of conveying a better understanding to the skilled person, but is not intended to restrict the scope. Much rather, the scope is defined by the appended claims, where reference signs are also included for better understanding and do not restrict the scope.

What is claimed is:

1. A communication device for data unit based communication, comprising implementations of a first and second communication protocol (L1, L2_ARQ), where said first protocol (L1) provides rules for controlling the transmission of data units of said second protocol (L2_ARQ) across a physical connection and provides at least two different reliability levels for the transmission of data units of said second protocol (L2_ARQ), and said second protocol (L2_ARQ) provides rules for the segmentation of data units of a third protocol (L2_FRAME; L3) into data units of said second protocol (L2_ARQ) and for the retransmission of data units of said second protocol (L2_ARQ), identifying means for identifying those data units of said second protocol (L2_ARQ) that belong to a defined data structure (L2_FRAME PDU; L3 PDU; L4 PDU; SW) containing data units of said second protocol (L2_ARQ), classifying means for classifying the data units of said second protocol (L2_ARQ) that belong to said defined data structure (L2_FRAME PDU; L3 PDU; L4 PDU; SW) into at least two different categories according to predetermined classification rules, and reliability setting means for setting the reliability level of said first protocol (L1) for the transmission and retransmission of a given data unit of said second protocol (L2_ARQ) to be transmitted, said reliability setting means being capable of setting said reliability level differently for the transmission and/or retransmission of data units of said second protocol (L2_ARQ) belonging to said defined data structure (L2_FRAME PDU; L3 PDU; L4 PDU; SW) that were classified into different categories.

2. A communication device according to claim 1, wherein said reliability levels provided by said first protocol (L1) are distinguished by at least one of transmission power, forward error control, spreading factor, interleaving depth, modulation and antenna diversity.

3. A communication device according to claim 1, wherein said defined data structure (L2_FRAME PDU; L3 PDU; L4 PDU; SW) is a data unit of said third protocol (L2_FRAME; L3) or of a protocol (L4) above said third protocol.

4. A communication device according to claim 3, wherein a first and a second category (GPW, SPW) are specified, where said classification rules are such that said first category (GPW) comprises zero data units or a consecutive number of data units, in terms of order of transmission, of said second protocol (L2_ARQ), including the first data unit of said second protocol (L2_ARQ) belonging to one data unit of said third protocol (L2_FRAME; L3), and said second category (SPW) comprises zero data units or a consecutive number of data units, in terms of order of transmission, of said second protocol (L2_ARQ) including the last data unit of said second protocol (L2_ARQ) belonging to said one data unit of said third protocol (L2_FRAME; L3).

5. A communication device according to claim 4, wherein said reliability setting means is arranged to set, if a predetermined condition is met, the reliability level of the data units of said second category (SPW) such that their transmission reliability across said physical connection is higher than the transmission reliability for the data units of said first category (GPW).

6. A communication device according to claim 5, wherein said predetermined condition is related to the number of data units of said first category (GPW) that need to be retransmitted.

7. A communication device according to claim 3, wherein said classification rules are related to different ranges of consecutive octets or bits of said one data unit of said third protocol (L2_FRAME; L3), said ranges each corresponding to a consecutive number of data units, in terms of order of transmission, of said second protocol (L2_ARQ).

8. A communication device according to claim 7, wherein at least a first and a second category are specified, where said first category is associated with the header of said one data unit of the third protocol (L2_FRAME; L3) and said second category is associated with the payload of said one data unit of the third protocol (L2_FRAME; L3).

9. A communication device according to claim 8, wherein said reliability setting means is arranged to set the reliability level of the data units of said first category such that their transmission reliability across said physical connection is higher than the transmission reliability for the data units of said second category.

10. A communication device according to claim 1, wherein
said second protocol (L2_ARQ) specifies window-based flow control according to which a defined number of consecutive octets or bits is used as a send window (SW) and the flow control is performed such that the allowed number of unacknowledged data units of said second protocol (L2_ARQ) is limited to said send window,
said defined data structure (L2_FRAME PDU; L3 PDU; L4 PDU; SW) is said send window (SW), and
said classification rules relate to the position in the send window (SW) and/or the number of retransmissions of a given data unit of said second protocol (L2_ARQ).

11. A communication device according to claim 10, wherein said reliability setting means is arranged to set the reliability level for successive retransmissions of a given data unit such that the transmission reliability across said physical connection is higher for a given retransmission of said given data unit than for the previous first transmission or retransmission of said given data unit.

12. A communication method for data unit based communication
using implementations of a first and second communication protocol, where said first protocol (L1) provides rules for controlling the transmission of data units of said second protocol (L2_ARQ) across a physical connection and provides at least two different reliability levels for the transmission of data units of said second protocol (L2_ARQ), said second protocol (L2_ARQ) provides rules for the segmentation of data units of a third protocol (L2-FRAME; L3) into data units of said second protocol (L2_ARQ) and for the retransmission of data units of said second protocol (L2_ARQ),
comprising the steps:
identifying (S1) those data units of said second protocol (L2_ARQ) that belong to a defined data structure (L2_FRAME PDU; L3 PDU; L4 PDU; SW) containing data units of said second protocol (L2_ARQ),
classifying (S2) the data units of said second protocol (L2_ARQ) that belong to said data structure (L2_FRAME PDU; L3 PDU; L4 PDU; SW) into at least two different categories according to predetermined classification rules, and
providing the capability (S3, S4, S5) of setting said reliability level for the transmission and/or retransmission differently for data units of said second protocol (L2_ARQ) belonging to said data structure (L2_FRAME PDU; L3 PDU; L4 PDU; SW) that were classified into different categories.

13. A communication method according to claim 12, wherein said reliability levels provided by said first protocol (L1) are distinguished by at least one of transmission power, forward error control, spreading factor, interleaving depth, modulation and antenna diversity.

14. A communication method according to claim 12, wherein said defined data structure (L2_FRAME PDU; L3 PDU; L4 PDU; SW) is a data unit of said third protocol (L2_FRAME; L3) or of a protocol (L4) above said third protocol.

15. A communication method according to claim 14, wherein a first and a second category (GPW, SPW) are specified, where said classification rules are such that said first category (GPW) comprises zero data units or a consecutive number of data units, in terms of order of transmission, of said second protocol (L2_ARQ), including the first data unit of said second protocol (L2_ARQ) belonging to one data unit of said third protocol (L2_FRAME; L3), and said second category (SPW) comprises zero data units or a consecutive number of data units, in terms of order of transmission, of said second protocol (L2_ARQ) including the last data unit of said second protocol (L2_ARQ) belonging to said one data unit of said third protocol (L2_FRAME; L3).

16. A communication method according to claim 15, wherein said in the reliability setting step, if a predetermined condition is met, the reliability level of the data units of said second category (SPW) is set such that their transmission reliability across said physical connection is higher than the transmission reliability for the data units of said first category (GPW).

17. A communication method according to claim 16, wherein said predetermined condition is related to the number of data units of said first category (GPW) that need to be retransmitted.

18. A communication method according to claim 14, wherein said classification rules are related to different ranges of consecutive octets or bits of said one data unit of said third protocol (L2_FRAME; L3), said ranges each corresponding to a consecutive number of data units, in terms of order of transmission, of said second protocol (L2_ARQ).

19. A communication method according to claim 18, wherein at least a first and a second category are specified, where said first category is associated with the header of said one data unit of the third protocol (L2_FRAME; L3) and said second category is associated with the payload of said one data unit of the third protocol (L2_FRAME; L3).

20. A communication method according to claim 19, wherein in said reliability setting step the reliability level of the data units of said first category is set such that their transmission reliability across said physical connection is higher than the transmission reliability for the data units of said second category.

21. A communication method according to claim 12, wherein said second protocol (L2_ARQ) specifies window-based flow control according to which a defined number of consecutive octets or bits is defined as a send window (SW) and the flow control is performed such that the allowed number of unacknowledged data units of said second protocol (L2_ARQ) is limited to said send window, said defined data structure (L2_FRAME PDU; L3 PDU; L4 PDU; SW) is said send window (SW), and said classification rules relate to the position in the send window (SW) and/or the number of retransmissions of a given data unit of said second protocol (L2_ARQ).

22. A communication method according to claim 21, wherein the reliability level for successive retransmissions of a given data unit is set such that the transmission reliability across said physical connection is higher for a given retransmission of said given data unit than for the previous first transmission or retransmission of said given data unit.

23. A communication device for data unit based communication, comprising implementations of a first and second communication protocol (L1, L2_ARQ), where said first protocol (L1) provides rules for controlling the transmission of data units of said second protocol (L2_ARQ) across a physical connection and provides at least two different reliability levels for the transmission of data units of said second protocol (L2_ARQ), and said second protocol (L2_ARQ) provides rules for the segmentation of data units of a third protocol (L2_FRAME; L3) into data units of said second protocol (L2_ARQ) and for the retransmission of data units of said second protocol (L2_ARQ), classifying means for classifying the data units of said second protocol (L2_ARQ) into at least a first and a second category, said classifying of a given data unit of said second protocol (L2_ARQ) being done on the basis of information contained in the data unit of said third protocol (L2_FRAME; L3) of which said given data unit of said second protocol (L2_ARQ) is a segment, reliability setting means for setting the reliability level of said first protocol (L1) for the transmission and retransmission of data units of said second protocol (L2_ARQ) to be transmitted, said reliability setting means being capable of setting said reliability level differently for the transmission and/or retransmission of data units of said second protocol (L2_ARQ) belonging to said first category than for the transmission and/or retransmission of data units of said second protocol (L2_ARQ) belonging to said second category.

24. A communication device according to claim 23, wherein said classifying means is capable of reading one or more predetermined fields in the data units of said third protocol (L2_FRAME; L3) to thereby classify the data units of said second protocol (L2_ARQ) into which a data unit of said third protocol is segmented.

25. A communication device according to claim 24, wherein said data units of said third protocol (L2_FRAME; L3) comprise a header and a payload section, where the header contains a protocol identifying field and the payload section may contain one or more protocol identifying fields associated with data units of protocols that are of layers higher than said third protocol (L2_FRAME; L3) that may be encapsulated in said data unit of said third protocol (L2_FRAME; L3), and said predetermined fields that the classifying means may read comprise at least one of said protocol identifying field in said header and the one or more protocol identifying fields contained in said payload section.

26. A communication device according to claim 24, wherein said data units of said third protocol (L2_FRAME; L3) comprise one or more quality of service fields that are associated with respective protocols, and and said predetermined fields that the classifying means may read comprise at least one of said quality of service fields.

27. A communication device according to one of claims 23, wherein said first category contains data units of said second protocol (L2_ARQ) that are segments of data units of said third protocol (L2_FRAME; L3) that encapsulate data units of a first higher layer protocol (TCP) that specifies retransmission of data units of said first higher layer protocol (TCP) under predetermined conditions, and said second category contains data units of said second protocol (L2_ARQ) that are segments of data units of said third protocol (L2_FRAME; L3) that encapsulate data units of a second higher layer protocol (UDP) that does not specify retransmission of data units of said second higher layer protocol (UDP).

28. A communication device according to claim 27, wherein said reliabilty setting means is arranged to set the reliability level of said data units of said second protocol (L2_ARQ) in said second category higher than the reliability level (L2_ARQ) of said data units of said second protocol (L2_ARQ) in said first category.

* * * * *